(12) United States Patent
Mi et al.

(10) Patent No.: US 6,816,227 B2
(45) Date of Patent: Nov. 9, 2004

(54) GRAY SCALE AND COLOR CHOLESTERIC LIQUID CRYSTAL DISPLAYS

(75) Inventors: Xiang-Dong Mi, Rochester, NY (US); Stanley W. Stephenson, Spencerport, NY (US)

(73) Assignee: Eastman Kodak Company, Rochester, NY (US)

(*) Notice: Subject to any disclaimer, the term of this patent is extended or adjusted under 35 U.S.C. 154(b) by 361 days.

(21) Appl. No.: 09/923,659

(22) Filed: Aug. 7, 2001

(65) Prior Publication Data

US 2003/0034945 A1 Feb. 20, 2003

(51) Int. Cl.[7] .................. C09K 19/02; C09K 1/1347

(52) U.S. Cl. .................. 349/185; 349/183; 349/76; 349/86; 349/92; 349/80; 349/184

(58) Field of Search .................. 349/185, 183, 349/76, 86, 92, 80, 184, 172, 101, 91

(56) References Cited

U.S. PATENT DOCUMENTS

| | | | |
|---|---|---|---|
| 4,435,047 A | 3/1984 | Fergason | |
| 5,251,048 A | 10/1993 | Doane et al. | |
| 5,384,067 A | 1/1995 | Doane et al. | |
| 5,437,811 A | 8/1995 | Doane et al. | |
| 5,453,863 A | 9/1995 | West et al. | |
| 5,503,952 A | 4/1996 | Suzuki et al. | |
| 5,644,330 A | 7/1997 | Catchpole et al. | |
| 5,695,682 A | 12/1997 | Doane et al. | |
| 5,748,277 A | 5/1998 | Huang et al. | |
| 6,061,107 A | 5/2000 | Yang et al. | |
| 6,556,262 B1 * | 4/2003 | Stephenson et al. | 349/86 |
| 2002/0093605 A1 * | 7/2002 | Stephenson | 349/86 |

OTHER PUBLICATIONS

"Liquid Crystal Dispersions" by Paul Drzaic, World Scientific, Singapore, 1995, p. 408.
"LP-1: Late-News Poster: Gray Scale of Bistable Reflective Cholesteric Displays" by X.-Y. Huang et al. SID 98 Digest, pp. 810–813 (1998).
"Gray Scale Drive Schemes for Bistable Cholesteric Reflective Displays" by J. Gandhi et al., Asia Display 98, pp. 127–130 (1998).
"Cholesteric Reflective Display: Drive Scheme and Contrast" by D. Yang et al., Applied Physics Letter 64, Apr. 11, 1994, pp. 1905–1907.
"S8–4 Electronic Newspaper Display" by Z. Yaniv et al., Proc. of International Display Research Conference, 113 (1995).
"Full Color (4096 Colors) Reflective Cholesteric Liquid Crystal Display" by X.-Y. Huang et al., Asia Display 98, pp. 883–886.
"13:2: Multicolor Reflective Cholesteric Displays" by L.-C. Chien et al., SID 95 Digest, XXVI, pp. 169–171.

* cited by examiner

Primary Examiner—Jerome Jackson
Assistant Examiner—Joseph Nguyen
(74) Attorney, Agent, or Firm—Kathleen Neuner Manne

(57) ABSTRACT

A cholesteric liquid crystal display with gray scales is disclosed which includes a substrate, a patterned first conductor disposed over the substrate, and a layer including a cholesteric liquid crystal material dispersed over the first patterned conductor. The display further includes a patterned second conductor disposed over the lay including cholesteric liquid crystal, and control means for applying voltages across particular portions of the patterned first and second conductors to cause electric fields to portions of the cholesteric liquid crystal layer to directly change its reflectance into a plurality of reflectance. The gray scale of the display can be obtained by a single pulse voltage independent of the initial state of the said display.

8 Claims, 10 Drawing Sheets

GRAY SCALE AND COLOR CHOLESTERIC LIQUID CRYSTAL DISPLAYS

CROSS REFERENCE TO RELATED APPLICATION

Reference is made to commonly assigned U.S. patent application Ser. No. 09/379,776, filed Aug. 24, 1999 by Dwight J. Petruchik et al., U.S. patent application Ser. No. 09/723,389, filed Nov. 28, 2000 by David M. Johnson et al., and U.S. patent application Ser. No. 09/851,868, filed May 9, 2001 by Stanley W. Stephenson et al., the disclosures of which are incorporated herein by reference.

FIELD OF THE INVENTION

The present invention relates to bistable cholesteric liquid crystal displays and their electrical drive schemes.

BACKGROUND OF THE INVENTION

Currently, information can be displayed using assembled sheets of paper carrying permanent inks or displayed on electronically modulated surfaces such as cathode ray displays or liquid crystal displays. Other sheet materials can carry magnetically writable areas to carry ticketing or financial information, however magnetically written data is not visible.

Flat panel displays use two transparent glass plates as substrates. In a typical embodiment, such as one set forth in U.S. Pat. No. 5,503,952, a set of electrical traces is sputtered in pattern of parallel lines that form a first set of conductive traces. A second substrate is similarly coated with a set of traces having a transparent conductive coating. Coatings are applied and the surfaces rubbed to orient liquid crystals. The two substrates are spaced apart and the space between the two substrates is filled with a liquid crystal material. Pairs of conductors from either set are selected and energized to alter the optical transmission properties of the liquid crystal material. Such displays are expensive, and currently are limited to applications having long lifetimes.

Fabrication of flexible, electronically written display sheets using conventional nematic liquid crystals materials is disclosed in U.S. Pat. No. 4,435,047. A first sheet has transparent indium-tin-oxide (ITO) conductive areas and a second sheet has electrically conductive inks printed on display areas. The sheets can be thin glass, but in practice have been formed of Mylar polyester. A dispersion of liquid crystal material in a binder is coated on the first sheet, and the second sheet is bonded to the liquid crystal material. Electrical potential is applied to opposing conductive areas to operate on the liquid crystal material and expose display areas. The display uses nematic liquid crystal materials, which ceases to present an image when de-energized. Privacy windows are created from such materials using the scattering properties of conventional nematic liquid crystals. Nematic liquid crystals require continuous electrical drive to remain transparent.

U.S. Pat. No. 5,437,811 discloses a light-modulating cell having a chiral nematic liquid crystal in polymeric domains contained by conventional patterned glass substrates. The chiral nematic liquid crystal has the property of being driven between a planar state reflecting a specific visible wavelength of light and a light scattering focal conic state. Chiral nematic material has the capacity of maintaining one of the given states in the absence of an electric field.

In "Liquid Crystal Dispersions", World Science, Singapore, 1995, page 408, Paul Drzaic discusses the electrical drive of cholesteric liquid crystal displays. Drzaic also states on page 29 that "The use of gelatin, however, creates a material that is too conductive for practical use in electrically addressed PDLC systems.". Drzaic further states ". . . actual displays require AC signals to prevent electrochemical degradation." Subsequent patents follow Drzaic's assumptions. Later patents such as U.S. Pat. Nos. 5,251,048 and 5,644,330 and 5,748,277 all require AC fields having a net zero unipolar field for matrix cholesteric liquid crystal displays to prevent ionic destruction of the display. The cited patents have display structures formed using expensive display structures and processes applicable to long-life situations which require AC drive schemes.

The drive schemes require that each element be written using alternating electrical fields that provide a net zero field across the display to prevent ionic migration. AC drives require large numbers of power supplies and large numbers of switching elements per line.

It is well known that the cholesteric liquid crystal displays have two optically bistable states. Multiple color can be obtained by color pixelization [Chien et al., SID 95 Digest, XXVI, pp.169–171 (1995)] or triple stack [Huang et al., ASIA DISPLAY 98, pp.883–886 (1998)]. Full colors of cholesteric displays rely on gray scales of individual color. Therefore, the development of a display with gray scale created using simple drive waveforms benefits from a lower cost electrical drive circuitry. Gray scale has been achieved with a binary dithering method [Z. Yaniv et al. Proc. of International Display Research Conference, 113 (1995)]. However, this method significantly sacrificed the effective resolution. Gray scale has also been achieved by controlling the proper mixing ratio of the planar (reflective) state and the focal conic (non-reflective) state within one pixel. But with disclosed cholesteric liquid crystal displays, the response of the reflectance to the driving voltage is dependent on the initial state. Yang et al. stated in Appl. Phys. Lett. 64, p.1905 (1994) that "For the gray scale display, first the display has to be freshened, that is, a high voltage pulse applied to all the pixels to drive them into the reflecting state." In order to achieve a gray scale, a driving voltage is required to switch the display into an intermediate state. For example, cholesteric displays were first switched into either the planar state or the focal conic state by a proper voltage pulse before a selection phase which selects the gray scale was applied [Gandhi et al., Asia Display 98, pp.127–130 (1998)]. In another example, the cholesteric displays were first switched into the homeotropic state by a sufficiently high driving voltage [Huang et al., SID Digest 98, pp.810–813 (1998)]. This high voltage functioned as erasing memory.

Commonly assigned U.S. patent application Ser. No. 09/723,389 filed Nov. 28, 2000 by Johnson and Stephenson, the disclosure of which is incorporated herein by reference, disclosed that the planar state and the focal conic state could be achieved by a DC pulse.

SUMMARY OF THE INVENTION

It is an object of the present invention to provide low cost memory displays generated using coated polymer dispersed cholesteric liquid crystals on flexible substrates, and the response of the reflectance of the said displays to the driving voltage is independent of the initial state in a certain range of driving voltage.

It is another object of the present invention to provide a simpler, lower cost method of achieving gray scale images, which is the basic requirement for a color display.

It is another object of the present invention to provide a simpler, lower cost method of achieving full color images using the above mentioned gray scale displays with different colors.

These objects are achieved by a cholesteric liquid crystal display for producing gray scale images, comprising:

a) a layer including a polymeric host material, cholesteric liquid crystals in the host material and having a selected domain size, and a surfactant, the materials in the layer selected to cause the cholesteric liquid crystals to be effective in a number of different states of reflectivity and will remain in any given state until a field is applied;

b) electrodes disposed relative to the layer for applying an electric field to the layer when a voltage is applied to the electrodes; and c) means for applying at least one voltage pulse to the electrodes which cause the direct change of the cholesteric liquid crystals from any initial state to a particular state within a selected gray scale.

The present invention discloses a display for producing gray scale images by a DC pulse without need to erase memory (without need to first switch liquid crystals into an intermediate state).

Gray scale images of the said displays can be achieved by a simple combination of on-voltage pulse and off-voltage pulse without any voltage required before this selection-voltage.

The invention reduces the number of voltages required to drive such a display as well as reducing the number of voltage switching elements.

It is a feature of the present invention that it eliminates the need to work with glass substrates with associated complex manufacturing techniques. The present invention by making use of flexible polymeric substrates permits the use of unipolar fields to change reflectance. The present invention facilitates the life of displays as well as reducing the associated cost of the drive circuit.

DETAILED DESCRIPTION OF THE INVENTION

Figure 1:
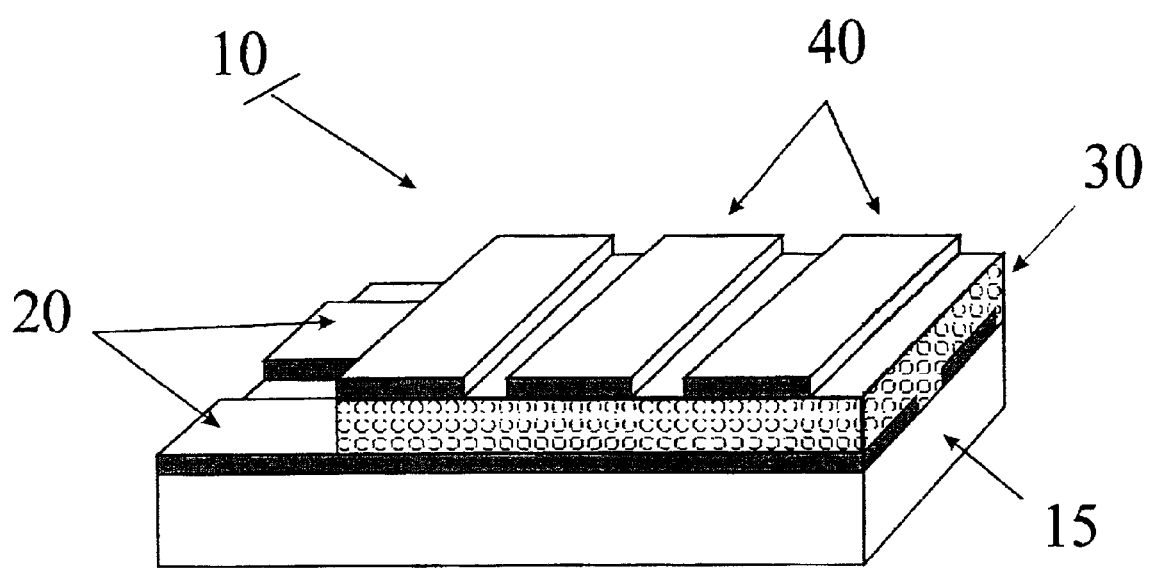
FIG. 1 is an isometric partial view of a cholesteric liquid crystal display made in accordance with the present invention.

FIG. 1 is an isometric partial view of a new structure for a display 10 made in accordance with the invention. Display 10 includes a flexible substrate 15, which is a thin transparent polymeric material, such as Kodak Estar film base formed of polyester plastic that has a thickness of between 20 and 200 microns. In an exemplary embodiment, substrate 15 can be a 125 micron thick sheet of polyester film base. Other polymers, such as transparent polycarbonate, can also be used.

Electrodes in the form of first patterned conductors 20 are formed over substrate 15. First patterned conductors 20 can be tin-oxide or indium-tin-oxide (ITO), with ITO being the preferred material. Typically the material of first patterned conductors 20 is sputtered as a layer over substrate 15 having a resistance of less than 250 ohms per square. The layer is then patterned to form first patterned conductors 20 in any well known manner. Alternatively, first patterned conductors 20 can be an opaque electrical conductor material such as copper, aluminum or nickel. If first patterned conductors 20 are opaque metal, the metal can be a metal oxide to create light absorbing first patterned conductors 20. First patterned conductors 20 are formed in the conductive layer by conventional photolithographic or laser etching means.

A polymer dispersed cholesteric layer 30 overlays first patterned conductors 20. Polymer dispersed cholesteric layer 30 includes a polymeric host material and dispersed cholesteric liquid crystal materials, such as those disclosed in U.S. Pat. No. 5,695,682, the disclosure of which is incorporated by reference. Application of electrical fields of various amplitude and duration can drive a chiral nematic (cholesteric) material into a reflective state, a transmissive state, or an intermediate state. These cholesteric materials have the advantage of maintaining a given state indefinitely after the field is removed. Cholesteric liquid crystal materials can be Merck BL112, BL118 or BL126, available from EM Industries of Hawthorne, N.Y.

In a preferred embodiment, the polymeric host material is provided by E. M. Industries cholesteric material BL-118 dispersed in deionized photographic gelatin. The liquid crystal material is dispersed at 8% concentration in a 5% deionized gelatin aqueous solution. The mixture is dispersed to create 10 micron diameter domains of the liquid crystal in aqueous suspension. The material is coated over a patterned ITO polyester sheet to provide a 7 micron thick polymer dispersed cholesteric coating. Other organic binders such as polyvinyl alcohol (PVA) or polyethylene oxide (PEO) can be used. Such compounds are machine coatable on equipment associated with photographic films.

Electrodes in the form of second patterned conductors 40 overlay of polymer dispersed cholesteric layer 30. Second patterned conductors 40 should have sufficient conductivity to carry a field across polymer dispersed cholesteric layer 30. Second patterned conductors 40 can be formed in a vacuum environment using materials such as aluminum, silver, platinum, carbon, tungsten, molybdenum, tin or indium or combinations thereof. The second patterned conductors 40 are as shown in the form of a deposited layer. Oxides of said metals can be used to darken second patterned conductors 40. The metal material can be excited by energy from resistance heating, cathodic arc, electron beam, sputtering or magnetron excitation. Tin-oxide or indium-tin oxide coatings permit second patterned conductors 40 to be transparent. Electrodes 20 and 40 disposed relative to polymer dispersed cholesteric layer 30 are in rows and columns so that the intersection of a row and column defines pixels for applying an electric field at each intersection to the polymer dispersed cholesteric layer 30 when a voltage is applied to the electrodes.

In a preferred embodiment, second patterned conductors 40 are printed conductive ink such as Electrodag 423SS screen printable electrical conductive material from Acheson Corporation. Such printed materials are finely divided graphite particles in a thermoplastic resin. The second patterned conductors 40 are formed using the printed inks to reduce display cost. The use of a flexible support for substrate 15, laser etching to form first patterned conductors 20, machine coating polymer dispersed cholesteric layer 30, and printing second patterned conductors 40 permits the fabrication of very low cost memory displays. Small displays formed using these methods can be used as electronically rewritable tags for inexpensive, limited rewrite applications.

Figure 2A:
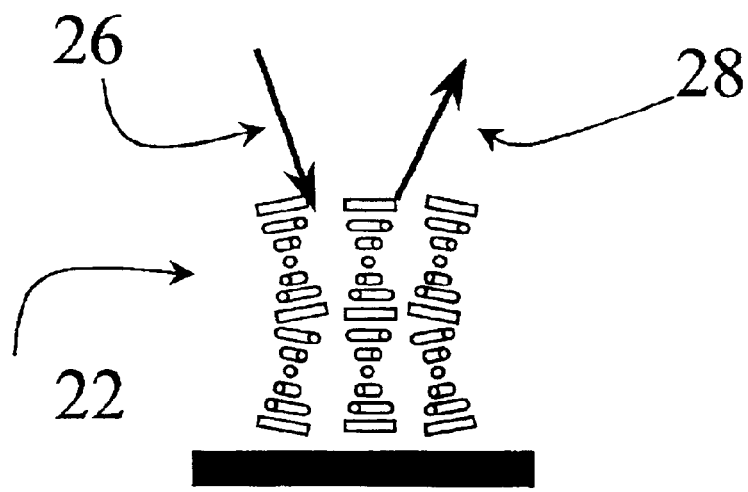
FIG. 2A is a schematic sectional view of a chiral nematic material in a planar state reflecting light.
Figure 2B:
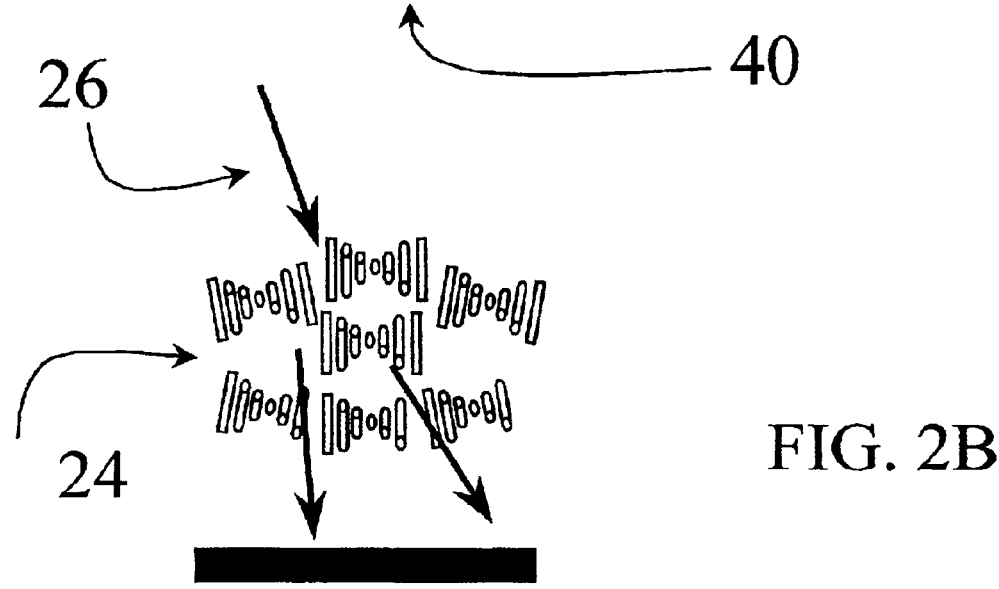
FIG. 2B is a schematic sectional view of a chiral nematic material in a focal conic state forward scattering light.
Figure 2C:
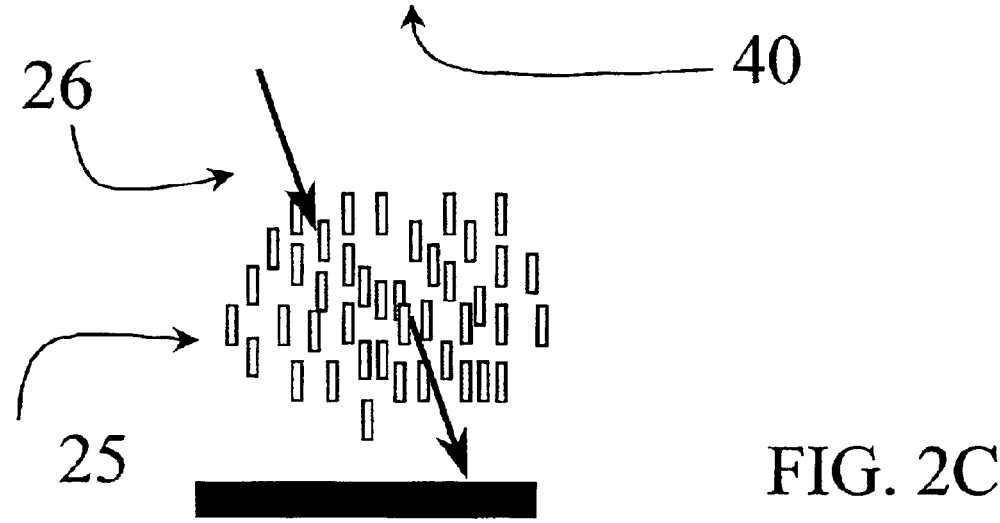
FIG. 2C is a schematic sectional view of a chiral nematic material in a homeotropic state transmitting light.

FIG. 2A and FIG. 2B show two stable states of cholesteric liquid crystals. In FIG. 2A, a high voltage field has been applied and quickly switched to zero potential, which converts cholesteric liquid crystal to a planar state 22. Incident light 26 striking cholesteric liquid crystal in planar state 22 is reflected as reflected light 28 to create a bright image. In FIG. 2B, application of a lower voltage field leaves cholesteric liquid crystal in a transparent focal conic state 24. Incident light 26 striking a cholesteric liquid crystal in focal conic state 24 is mainly forward scattered. Second patterned conductors 40 can be black which will absorb incident light 26 to create a dark image when the liquid crystal material is in focal conic state 24. As a result, a viewer perceives a bright or dark image depending on if the cholesteric material is in planar state 22 or focal conic state 24, respectively. In FIG. 2C, cholesteric liquid crystal is in a homeotropic state 25 when a high voltage is applied. Incident light 26 illuminating a cholesteric liquid crystal in homeotropic state 25 is transmitted.

Figure 3:
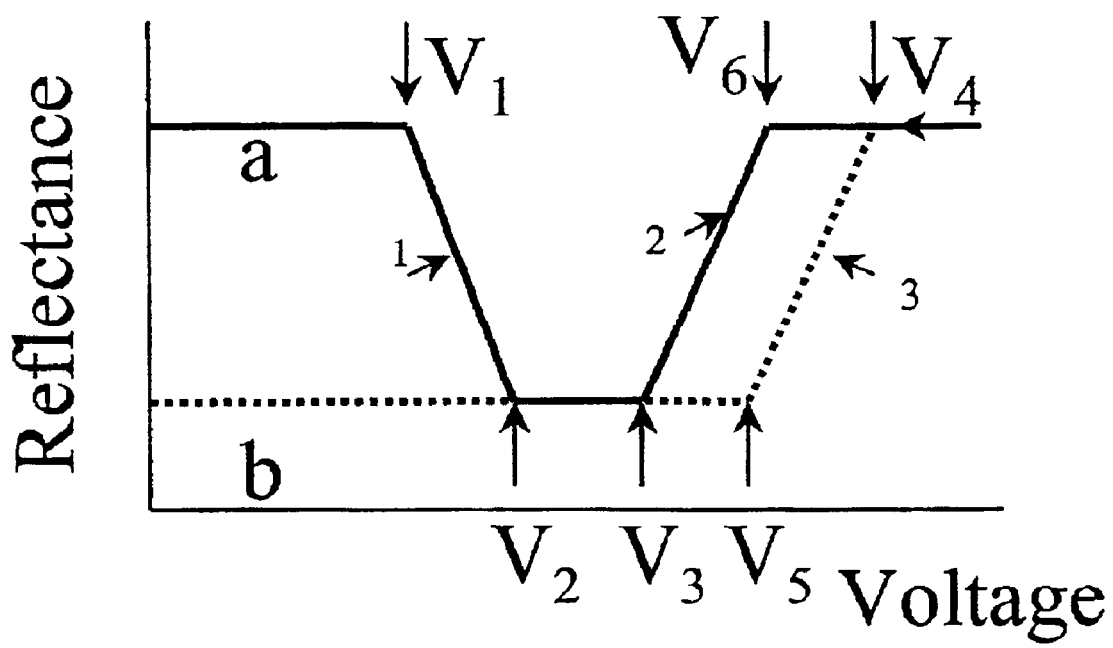
FIG. 3 is a typical plot of the response of reflectance of a cholesteric material to a pulsed voltage (prior art)

FIG. 3 is a typical plot of reflectance response of a cholesteric material to the applied pulse voltage. Curve a is obtained when the cholesteric liquid crystal is initially in a planar state 22 and Curve b is obtained when the cholesteric liquid crystal is initially in a focal conic state 24. Both curves are measured at some time after the applied pulse is over. Such curves can be found in U.S. Pat. Nos. 5,384,067, 5,453,863, and 5,695,682 and are also found in the above-cited Drzaic reference. For a given pulse time, typically between 5 and 200 milliseconds, a pulse at a given voltage can change the optical state of a cholesteric liquid crystal. The prior art written for cholesteric displays covers displays built using expensive conventional flat panel display processes. Consequently, bipolar voltage drive schemes are used for cholesteric displays to prevent ionic damage. The bipolar drives require at least two voltages and two separate semiconductor switching elements for each drive line.

In prior art, Curve a and Curve b lay on each other only when the pulse voltage is between V2 and V3, or greater than V4. V3 will hereinafter be referred to as the focal conic voltage or the off-voltage and V4 will be referred to as the planar voltage or the on-voltage. When the pulse voltage is between V2 and V3, the cholesteric liquid crystal is driven into a focal conic state 24. When the pulse voltage is above V4, the cholesteric liquid crystal is first switched into a homeotropic state 25, and then relaxes into a planar state 22. However, there does not exist a common-voltage, which can switch the cholesteric liquid crystal into the same gray scale image from either planar state 22 and focal conic state 24. Because Curve a and Curve b do not overlap between V3 and V4, an initial voltage pulse is required to drive all material into either planar state 22 or focal conic state 24 to form gray scale images.

Figure 4A:
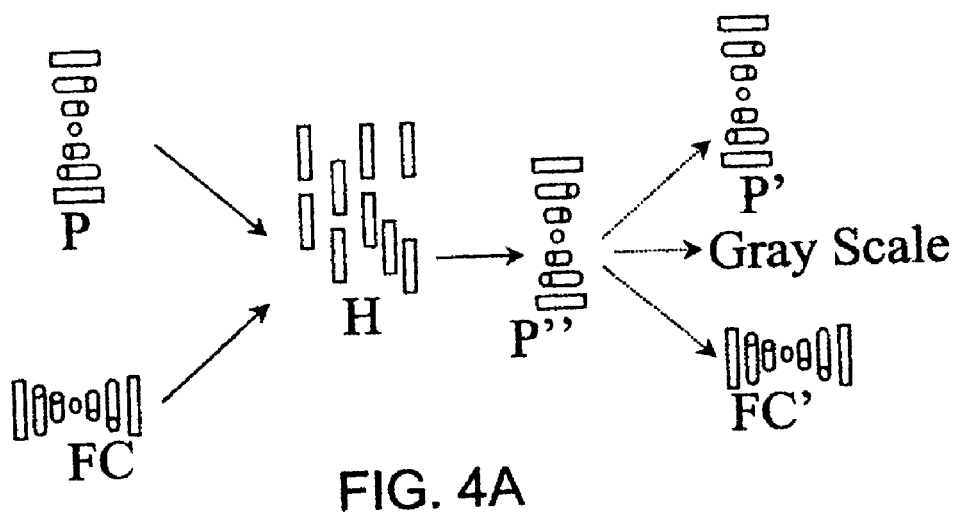
FIG. 4A is a schematic plot of one method to achieve gray scale by first switching into a state with maximum reflectance by a sufficiently high voltage pulse, followed by a low voltage pulse or a high voltage pulse (prior art)
Figure 4B:
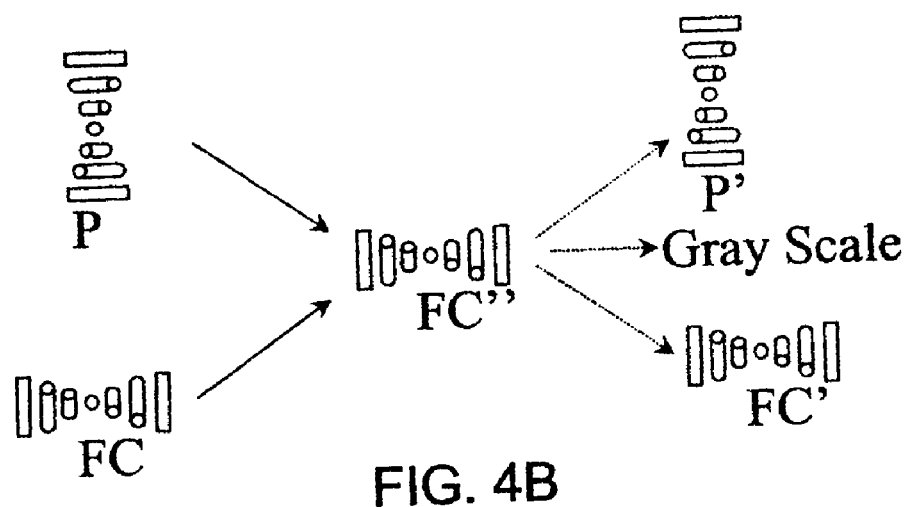
FIG. 4B is a schematic plot of another method to achieve gray scale by first switching into a state with minimum reflectance by a relatively low voltage pulse, then followed by a high voltage pulse (prior art)

FIG. 4A schematically shows a method of prior art [Gandhi et al, Asia Display 98, pp.127–130 (1998)] to achieve gray scale images. The cholesteric liquid crystal was first switched to a planar state 22 by a sufficiently high voltage above V4. Then the planar state 22 was selectively switched to different gray scale images based on Curve 1 by a pulsed voltage between V1 and V2 or Curve 2 by a pulsed voltage between V3 and V6 in FIG. 3. A second method to achieve gray scale images is shown in FIG. 4B. The cholesteric liquid crystal was first switch to a focal conic state 24 by a voltage between V2 and V3. Then the focal conic state 24 was selectively switched to different gray scale images by a pulsed voltage between V5 and V4 based on Curve 3 in FIG. 3.

Figure 4C:
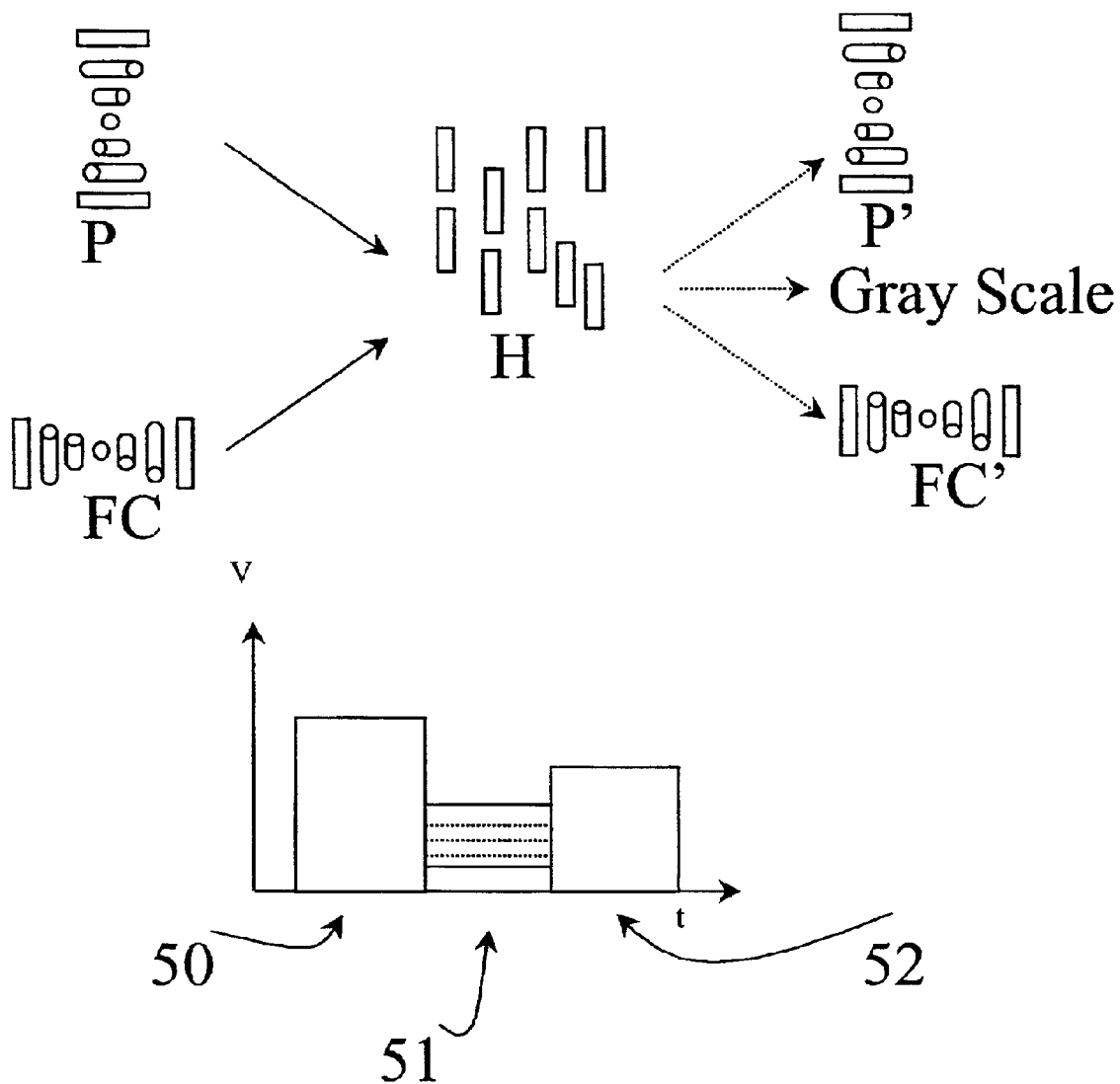
FIG. 4C is a schematic plot of a further method to achieve gray scale by switching into a state in which the liquid crystal is substantially parallel to the cell thickness by a sufficiently high voltage pulse, followed by a low voltage pulse, and another voltage pulse (prior art)

FIG. 4C describes another third method of prior art (Huang et al., SID Digest 98, pp.810–813 (1998)) to achieve a gray scale by a preparation phase 50 in which a sufficiently high voltage is applied, followed by a selection phase 51 and an evolution phase 52. An additional required pulse voltage phase such as 51 and 52 is not desirable. The current invention achieves gray scale images with a simple pulse voltage.

Figure 5:
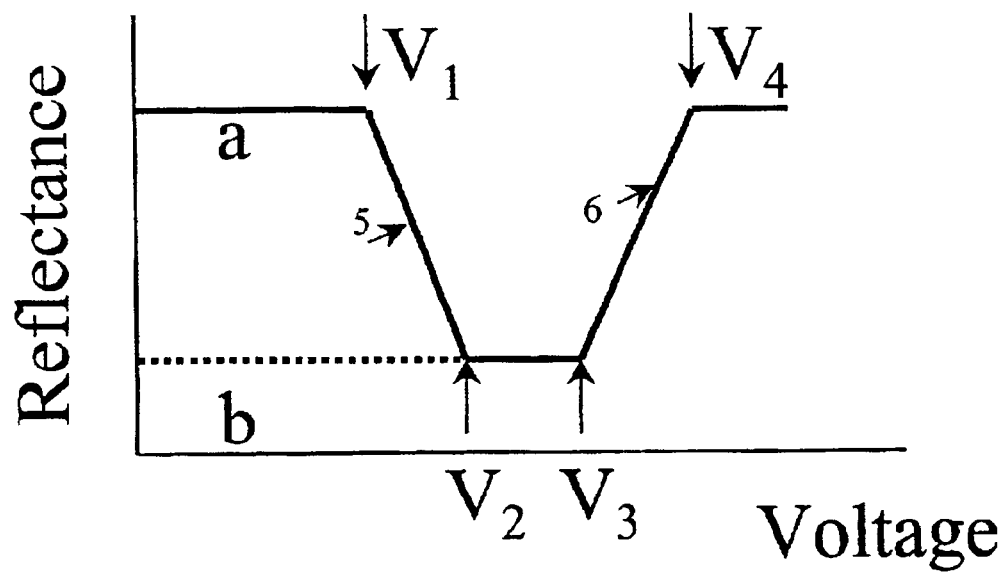
FIG. 5 is a schematic plot of the response of reflectance of a display to pulse voltage in accordance with the present invention.
Figure 5:
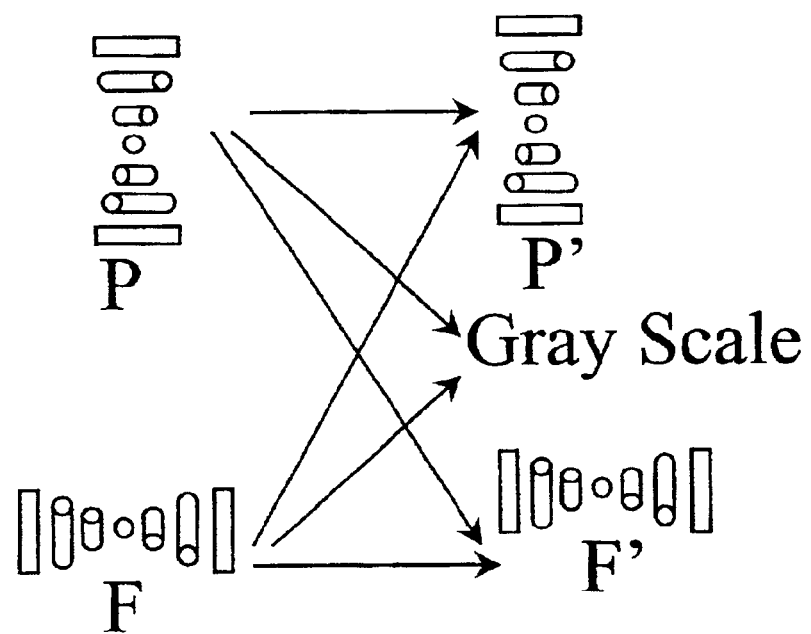

FIG. 5 is a schematic plot of reflectance response of a display in accordance with the present invention to applied pulse voltage. Certain polymeric dispersed formulations have the unique property that both planar state 22 and focal conic state 24 share a common optical response (Curve 6) within the voltage between V3 and V4. In this range of voltage, the reflectance varies from the minimum to the maximum continuously independent of initial state. For a given set of drive signals, the cholesteric material changes to a state between the focal conic and planar states irrespective of the initial state of the material. Therefore, the cholesteric liquid crystals are effective in a number of different states of reflectivity and will remain in any given state until a field is applied. In other words, applying a proper drive signals in the form of voltage pulses to the electrodes causes the direct change of the cholesteric liquid crystals from any initial state to a particular state within a selected gray scale. The initial state can be a planar state 22 (having a maximum reflectance), a focal conic state 24 (having a minimum reflectance), or any other intermediate state (having any gray level between the maximum reflectance and the minimum reflectance).

Figure 6A:
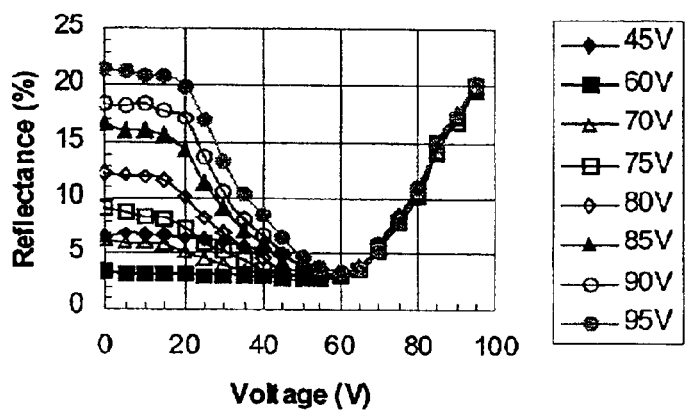
FIG. 6A is experimental data of the response of reflectance of a display to pulse voltage in accordance with the current invention using proper DC driving parameters.
Figure 6B:
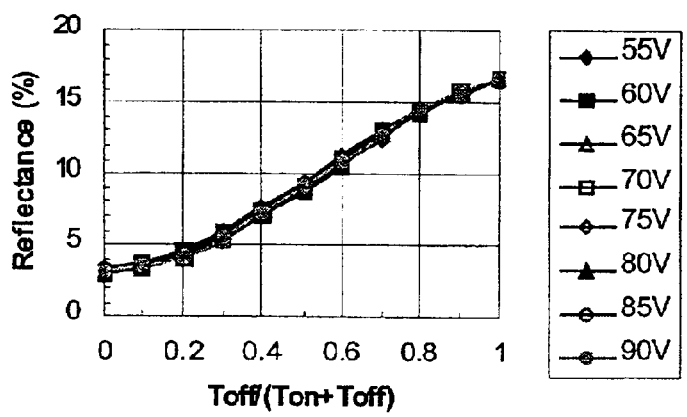
FIG. 6B is experimental data of the response of reflectance of a display to the ratio of Toff/(Ton+Toff) in accordance with the present invention using appropriate DC driving parameters.
Figure 6C:
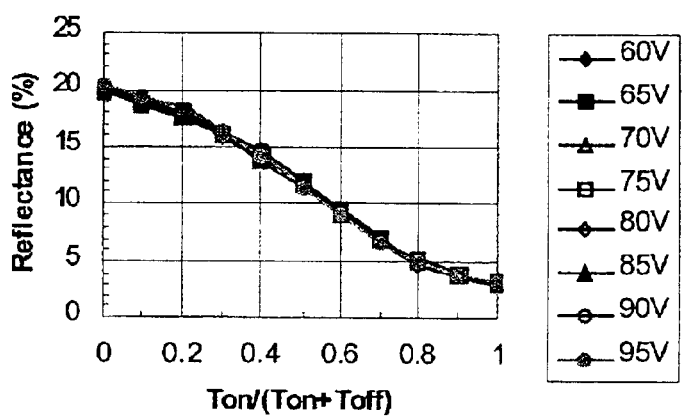
FIG. 6C is experimental data of the response of reflectance of a display to ratio of Ton/(Ton+Toff) in accordance with the present invention using appropriate DC driving parameters.

FIG. 6A is experimental data of reflectance response of an experimental material to the applied pulse voltage. A set of curves was generated which correspond to different initial states, which were set by a 200 ms long DC pulse of 50% duty cycle and 1 kHz. Various pulse voltages were applied, including 45 V, 60 V, 70 V, 75 V, 80 V, 85 V, 90 V, and 95 V. When a 200 ms long DC pulse of 50% duty cycle and 1 kHz with pulse voltage amplitude was applied to the liquid crystal display between 60 V and 90 V in accordance with the present invention, the reflectance responses were substantially the same for all initial states. The cholesteric liquid crystals were converted to a particular state within a selected gray scale irrespective of the initial state of the cholesteric liquid crystals. The "substantially" means that the maximum difference in reflectance at peak wavelength from various initial states is within 1% of reflectance at any voltage between the focal conic voltage (60 V) and the planar voltage (90 V), and preferably the maximum difference is even smaller than 1% of reflectance. In this embodiment, the reflectance was 20% at 90 V, and 3% at 60 V. When the maximum difference in reflectance was within 1% of reflectance, more than 16 gray levels could be easily distinguished. This unique electro-optical property allowed the display to be converted to any gray scale state by amplitude modulation of a simple DC pulse. Furthermore, a gray scale state could also be achieved by pulse width modulation, namely, by adjusting the duration Toff of focal conic voltage V3 and the duration Ton of planar voltage V4 over the total pulse interval Ton+Toff. FIG. 6B shows that when focal conic voltage V3 and planar voltage V4 were chosen as 60 V and 90 V, respectively, the change in the ratio of Toff/(Ton+Toff) resulted in various gray scale states substantially regardless of its initial states. In another example, FIG. 6C shows that when focal conic voltage V3 and planar voltage V4 were chosen as 60 V and 95 V, the change in the ratio of Ton/(Ton+Toff) also led to various gray scale states, which were substantially independent of the initial state of the liquid crystal.

Figure 7A:
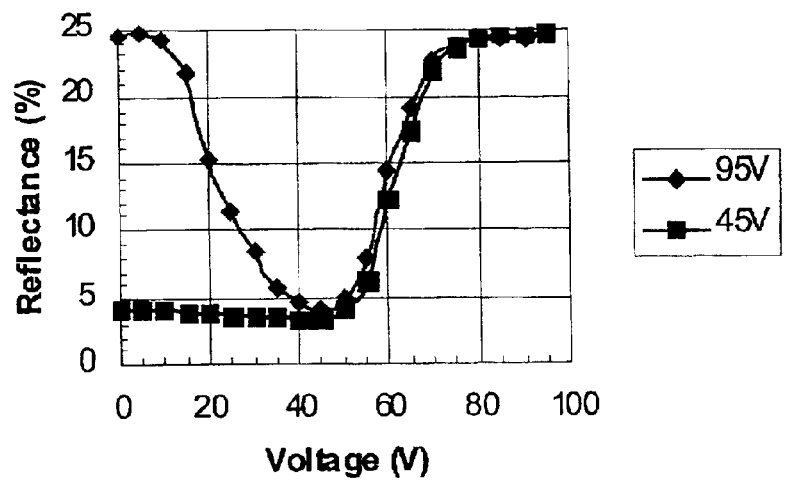
FIG. 7A is experimental data of the response of reflectance of a display to pulse voltage in accordance with the present invention driven without proper DC driving parameters.
Figure 7B:
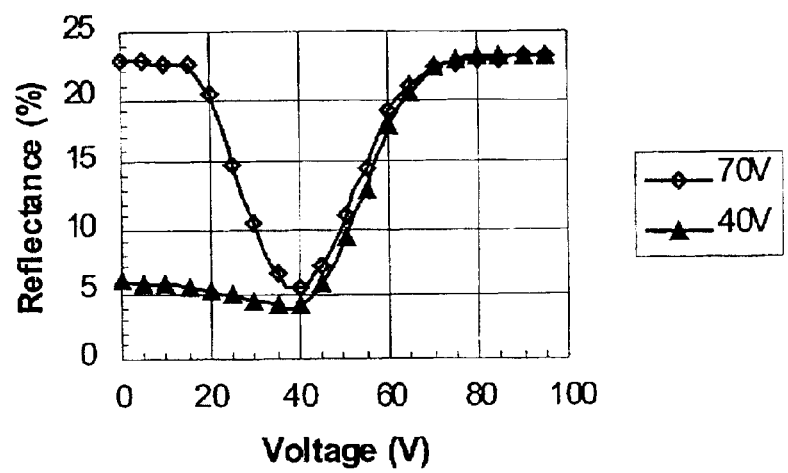
FIG. 7B is experimental data of the response of reflectance of a display to pulse voltage in accordance with the present invention driven with AC driving parameters.

This unique electro-optical property of this display also relied on the driving parameters, such as a predetermined duty cycle, frequency and number of pulses and amplitude. Without preferred driving parameters, planar state 22 and focal conic state 24 had different gray level responses to the voltage except for maximum and minimum reflectance as shown in FIG. 7A and FIG. 7B. In FIG. 7A, the pulse was DC, while in FIG. 7B, the pulse was AC.

Figure 8A:
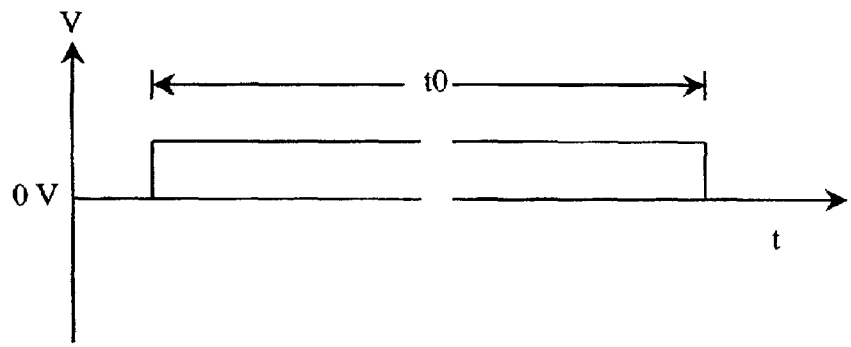
FIG. 8A is a plot of a continuous DC pulse with pulse width t0.
Figure 8B:
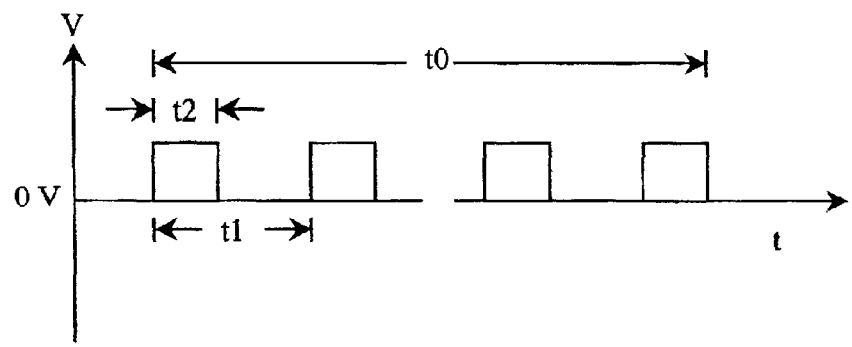
FIG. 8B is a plot of a DC pulse with pulse width t0 consisting of a series of sub continuous DC pulse characterized by sub pulse width t2 and duty cycle t2/t1.
Figure 8C:
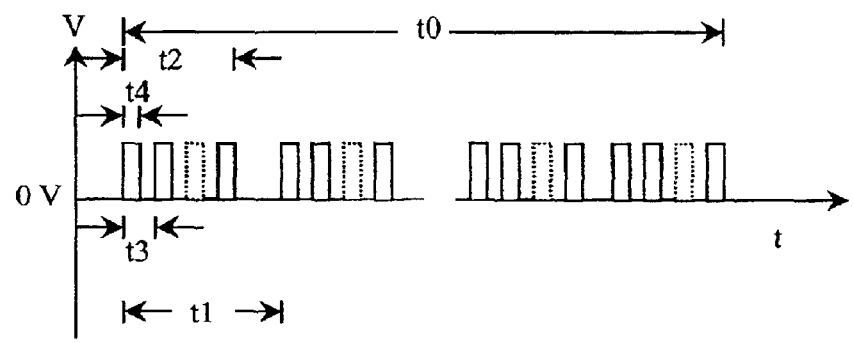
FIG. 8C is a plot of a DC pulse with pulse width t0 consisting of a series of sub DC pulse, with each sub DC pulse further consisting of a series of sub continuous pulse.
Figure 8D:
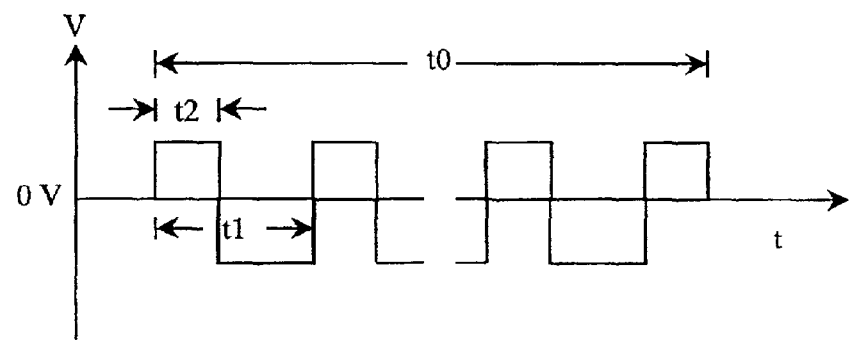
FIG. 8D is a plot of an AC pulse in comparison with a DC pulse consisting of a series of sub continuous DC pulse.

Surprisingly, it was observed that only a unipolar DC pulse with proper parameters resulted in this unique optical response. For this purpose, the electric field pulse is preferably a DC pulse. The DC pulse can be a continuous pulse (single pulse), which is fully characterized by pulse width t0 and amplitude, as shown in FIG. 8A. However, it should be understood that a DC voltage pulse can consist of a series of sub continuous DC voltage pulses, which is characterized by pulse width t0, duty cycle t2/t1, frequency 1/t1, as well as amplitude. The duty cycle is the ratio of the effective time duration over the total pulse width. FIG. 8B discloses a series of DC voltage pulses that can be used in accordance with the present invention. For comparison of a series of DC voltage pulses with a series of AC voltage pulses, FIG. 8D shows an AC pulse consisting of a series of sub voltage pulses characterized by pulse width t0, fraction of positive polarity t2/t1, frequency 1/t1, as well as amplitude. Furthermore, FIG. 8C shows that each sub DC pulse can have its own sub DC pulses, with each characterized by pulse width t2, duty cycle t4/t3, frequency 1/t3, as well as amplitude.

To effectively utilize the driving time, the ratios t1/t2 and t3/t4 are preferred to be integral numbers. When the DC pulse used is described by FIG. 8B, a few of rows up to t1/t2 can be grouped together to be selected. During the voltage pulse goes to zero for one row, the voltage pulse can be applied to the next few rows up to t1/2-1. Therefore, the effective driving time for each line is actually the total pulse time t0 multiplied by duty cycle t2/t1.

Figure 9A:
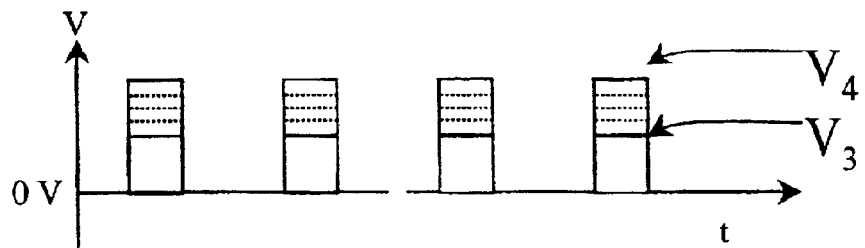
FIG. 9A is a plot of pulse amplitude modulation to achieve gray scale.
Figure 9B:
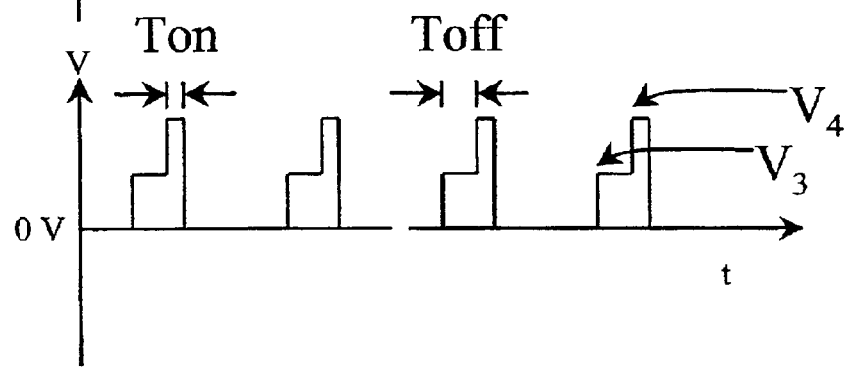
FIG. 9B is a plot of pulse width modulation to achieve gray scale, with a first off-voltage followed by an on-voltage.
Figure 9C:
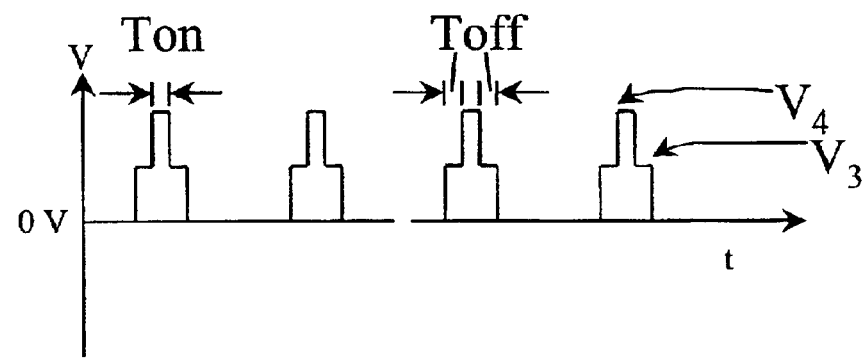
FIG. 9C is a plot of pulse width modulation to achieve gray scale, with a first off-voltage followed by on-voltage followed by an off-voltage.
Figure 9D:
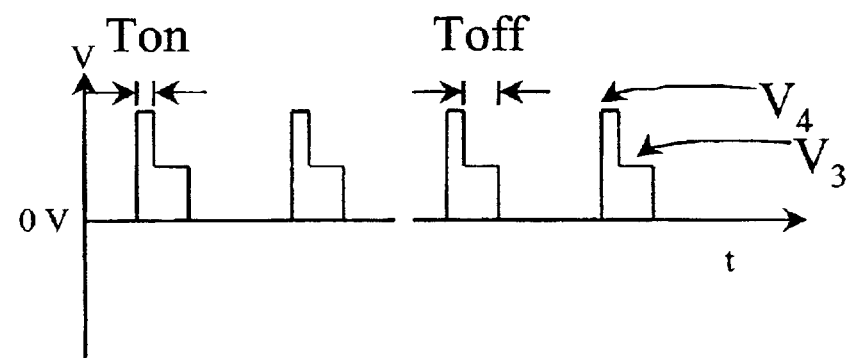
FIG. 9D is a plot of pulse width modulation to achieve gray scale, with a first on-voltage followed by an off-voltage.

FIG. 9A shows the waveforms for amplitude modulation. The gray scale images of the display is created by varying voltage amplitude between focal conic voltage and planar voltage. For pulse width modulation, there are various combinations of focal conic voltage and planar voltage. FIG. 9B shows the voltage pulse first consists of focal conic voltage V3 and then followed by planar voltage V4. FIG. 9C shows the voltage pulse first consists of focal conic voltage V3 followed by planar voltage V4, and then followed by focal conic voltage V3. FIG. 9D shows the voltage pulse first consists of planar voltage V4 and then followed by focal conic voltage V3.

EXAMPLE 1

In this example, gelatin dispersed cholesteric liquid crystal material was coated over ITO coated flexible substrate 15 to form polymer dispersed cholesteric layer 30. A small amount of surfactant was added in the dispersion to make the coating uniform. A one-inch square conductive patch was printed over the gelatin dispersed cholesteric material to provide a field across the coating. The cholesteric liquid crystal was BL118 from Merck, which reflected green light. In an example, the weight ratio of the cholesteric liquid crystal, the gelatin, and the surfactant was 8:5:1. The mixture was homogenized to create about 10 micron domains of the liquid crystal in aqueous suspension. A substantially common gray scale response of this display was achieved by a 70 millisecond DC pulse of duty cycle 50% and frequency 20 Hz. The same response was found using 140 millisecond DC pulse of duty cycle 20% and frequency 50 Hz. Furthermore a common response was found using 140 millisecond DC pulse of duty cycle 25% and frequency 100 Hz, or 500 millisecond DC pulse of duty cycle 100%. Other driving parameters could be found by those skilled in the art.

EXAMPLE 2

A display patch was prepared as in Example 1, except that the ratio of the cholesteric liquid crystal, the gelatin, and the surfactant varied. The ratios were 1:1:0.06, 1.6:1:0.06, 2.4:1:0.6, and 4:1:0.6, respectively. The dry coating thickness varied from 2.6 microns to 13.3 microns. A substantially same gray scale response of this display from different initial states made as above described was obtained driven using proper DC driving parameters. A larger dry thickness enhances reflectance, but also increases driving voltage. As a tradeoff, the layer including a polymeric host material and cholesteric liquid crystals prefers to have a dry thickness less than 15 microns.

EXAMPLE 3

A display patch was prepared as in Example 1, except that the size of liquid crystal domains in aqueous suspension varied from 4.8 to 16.1 microns. This size was measured before the dispersion was coated over ITO coated PET film. A substantially same gray scale response of this display from different initial states made as above described was obtained driven using proper DC driving parameters. Typically, for a given ratio of gelatin and cholesteric liquid crystal, there is an optimized domain size for the liquid crystal. When the ratio of gelatin and cholesteric liquid crystal varies from 1:2 to 4:1, the liquid crystal domain size is preferably selected to be in a range of 4 to 20 microns.

Displays according to the invention were tested using a 20 millisecond unipolar field switched across display 10 every 5 seconds to switch the state of the material between the planar and focal conic states. The gelatin dispersed cholesteric material was driven through a limited life test of 10,000 rewrites. The life testing was equivalent to 200 seconds of continuous applied unipolar voltage to display 10. The test patch operated with no apparent visible degradation throughout the life test. The life test was then extended to 100,000 cycles. The test display 10 continued to perform with little degradation. From this experiment, it was concluded that polymeric dispersed cholesteric materials on flexible substrates 15 with printed conductors can be driven by unipolar (DC) fields for at least the limited number of life cycles needed for limited-life display applications. Such displays benefit from a drive scheme that uses inexpensive, simple switching chips operating on a single voltage.

It will be understood that a color display can be made in accordance with the invention, which is comprised of a plurality of displays, which are discussed above. In this case, the cholesteric liquid crystals in the different displays will produce a different color so that a multicolored image can be produced.

The invention has been described in detail with particular reference to certain preferred embodiments thereof, but it will be understood that variations and modifications can be effected within the spirit and scope of the invention.

| PARTS LIST | |
|---|---|
| 10 | display |
| 15 | substrate |
| 20 | first patterned conductors |
| 22 | planar state |
| 24 | focal conic state |
| 25 | homeotropic state |
| 26 | incident light |
| 28 | reflected light |
| 30 | polymer dispersed cholesteric layer |
| 40 | second patterned conductors |
| 50 | preparation phase |
| 51 | selection phase |
| 52 | evolution phase |

-continued

| PARTS LIST | |
|---|---|
| FC, FC', FC" | focal conic |
| P, P', P" | planar |
| H | homeotropic |
| V1 | disturbance voltage |
| V2 | voltage at which the cholesteric liquid crystal is completely switched to focal conic state from planar state |
| V3 | focal conic voltage |
| V4 | planar voltage |
| V5 | voltage at which the cholesteric liquid crystal starts to transform from focal conic state to planar state |
| V6 | voltage at which the cholesteric liquid crystal is completely switched to homeotropic state from planar state and relaxes to planar state after the pulse is removed |
| T0 | total pulse duration |
| T1 | period of the total pulse |
| T2 | duration of positive polarity of the total pulse |
| T3 | period of sub pulse |
| T4 | duration of positive polarity of sub pulse |
| Ton | duration of planar voltage |
| Toff | duration of focal conic voltage |

What is claimed is:

1. A cholesteric liquid crystal display for producing gray scale images, comprising:

a) a layer including a polymeric host material, cholesteric liquid crystals in the host material and having a selected domain size, and a surfactant, the materials in the layer selected to cause the cholesteric liquid crystals to be effective in a number of different states of reflectivity and will remain in any given state until a field is applied;

b) electrodes disposed relative to the layer for applying an electric field to the layer when a voltage is applied to the electrodes; and c) means for applying at least one voltage pulse to the electrodes which cause the direct change of the cholesteric liquid crystals from any initial state to a particular state within a selected gray scale.

2. A cholesteric liquid crystal display for producing gray scale images, comprising:

a) a layer including a polymeric host material, cholesteric liquid crystals in the host material and having a selected domain size in a range of 4 to 20 microns, the layer having a dry thickness less than 15 microns, and a surfactant, the cholesteric liquid crystals being effective in a number of different states of reflectivity and will remain in any given state until a field is applied;

b) electrodes disposed relative to the layer for applying an electric field to the layer when a voltage is applied to the electrodes; and c) means for applying a series of voltage pulses to the electrodes which cause the direct change of the cholesteric liquid crystals from any initial state to a particular state within a selected gray scale.

3. A cholesteric liquid crystal display for producing gray scale images, comprising:

a) a layer including a polymeric host material, cholesteric liquid crystals in the host material and having a domain size selected to be in a range of 4 to 20 microns, the layer having a dry thickness less than 15 microns, and a surfactant, the cholesteric liquid crystals being effective in a number of different states of reflectivity and will remain in any given state until a field is applied;

b) electrodes disposed relative to the layer for applying an electric field to the layer when voltage is applied to the electrodes; and c) means for applying a series of voltage pulses to the electrodes having a predetermined duty cycle, frequency and number of pulses and amplitude, the amplitude being selected that will cause the cholesteric liquid crystals to be in a particular state within a selected gray scale irrespective of the initial state of the cholesteric liquid crystals.

4. A cholesteric liquid crystal display for producing gray scale images, comprising:

a) a layer including a polymeric host material, cholesteric liquid crystals in the host material and having a domain size selected to be in a range of 4 to 20 microns, the layer having a dry thickness less than 15 microns, and a surfactant, the cholesteric liquid crystals being effective in a number of different states of reflectivity and will remain in any given state until a field is applied;

b) electrodes disposed relative to the layer in rows and columns so that the intersection of a row and column defines pixels for applying an electric field at each intersection to the layer when a voltage is applied to the electrodes; and c) means for applying a series of voltage pulses to the rows and columns of the electrodes which cause the direct change of the cholesteric liquid crystals in the pixels from any initial state to a particular state within a selected gray scale.

5. A cholesteric liquid crystal display for producing gray scale images, comprising:

a) a layer including a polymeric host material, cholesteric liquid crystals in the host material and having a selected domain size, and a surfactant, the materials in the layer selected to cause the cholesteric liquid crystals to be effective in a number of different states of reflectivity and will remain in any given state until a field is applied the cholesteric liquid crystals wherein for a given set of drive signals, the cholesteric material changing to a state between the focal conic and planar states irrespective of the initial state of the material;

b) electrodes disposed relative to the layer for applying an electric field to the layer when a voltage is applied to the electrodes; and c) means for applying the drive signals in the form of voltage pulses to the electrodes which cause the direct change of the cholesteric liquid crystals from any initial state to a particular state within a selected gray scale.

6. A color display having a plurality of displays in accordance with claim 1 with the cholesteric liquid crystals in the different displays producing a different color to thereby produce a multicolored image.

7. A cholesteric liquid crystal display for producing gray scale images, comprising:

a) a layer including a polymeric host material, cholesteric liquid crystals in the host material and having a selected domain size, and a surfactant, the materials in the layer selected to cause the cholesteric liquid crystals to be effective in a number of different states of reflectivity and will remain in any given state until a field is applied;

b) electrodes disposed relative to the layer for applying an electric field to the layer when a voltage is applied to the electrodes;

c) means for applying at least one voltage pulse to the electrodes; and d) said layer having a reflectance that varies continuously from a minimum value to a maximum value in response to a range of voltages applied by said means for applying at least one voltage pulse and independent of an initial state of said layer.

8. A cholesteric liquid crystal display for producing gray scale images, comprising:

a) a layer including a polymeric host material, cholesteric liquid crystals in the host material and having a selected domain size, and a surfactant, the materials in the layer selected to cause the cholesteric liquid crystals to be effective in a number of different states of reflectivity and will remain in any given state until a field is applied;

b) electrodes disposed relative to the layer for applying an electric field to the layer when a voltage is applied to the electrodes; and c) means for applying at least one voltage pulse to the electrodes;

d) said layer having a common optical response curve that varies continuously from a minimum value to a maximum value within a range of applied voltage and independently of an initial state of said layer.

* * * * *